United States Patent
Oveis Gharan et al.

(10) Patent No.: US 11,233,568 B1
(45) Date of Patent: Jan. 25, 2022

(54) FEEDBACK EQUALIZATION WITH DELAY COMPENSATION

(71) Applicants: Shahab Oveis Gharan, Ottawa (CA); Ramin Babaee, Ottawa (CA); Martin Bouchard, Cantley (CA); Kim B. Roberts, Ottawa (CA)

(72) Inventors: Shahab Oveis Gharan, Ottawa (CA); Ramin Babaee, Ottawa (CA); Martin Bouchard, Cantley (CA); Kim B. Roberts, Ottawa (CA)

(73) Assignee: Ciena Corporation, Hanover, MD (US)

(*) Notice: Subject to any disclaimer, the term of this patent is extended or adjusted under 35 U.S.C. 154(b) by 0 days.

(21) Appl. No.: 17/090,135

(22) Filed: Nov. 5, 2020

(51) Int. Cl.
*H04B 10/06* (2006.01)
*H04B 10/2507* (2013.01)
(Continued)

(52) U.S. Cl.
CPC ..... *H04B 10/2572* (2013.01); *H04B 10/2569* (2013.01); *H04B 10/532* (2013.01); *H04B 10/677* (2013.01); *H04B 10/6971* (2013.01)

(58) Field of Classification Search
CPC .............. H04B 10/6971; H04B 10/677; H04B 10/2569; H04B 10/532; H04B 10/548; H04B 10/6161; H04B 10/6162; H04B 10/2507; H04B 10/40; H04B 10/2572; H04B 10/0795; H04J 14/06
USPC ....... 398/202, 208, 209, 204, 205, 206, 207, 398/212, 147, 81, 158, 159, 135, 136, 25, 398/26, 27, 184, 188, 161; 375/232, 233
See application file for complete search history.

(56) References Cited

U.S. PATENT DOCUMENTS

| 8,005,368 B2 | 8/2011 | Roberts et al. |
| 8,385,747 B2 | 2/2013 | Roberts et al. |

(Continued)

OTHER PUBLICATIONS

Pending Application U.S. Appl. No. 16/903,792, filed Jun. 17, 2020.
(Continued)

*Primary Examiner* — Hanh Phan
(74) *Attorney, Agent, or Firm* — Integral Intellectual Property Inc.; Amy Scouten; Miriam Paton

(57) ABSTRACT

A receiver is configured to detect, at a communication interface, a received signal that suffers from degradations incurred over a communication channel. The receiver applies an adaptive filter to a series of received blocks of a digital representation of the received signal, thereby generating respective filtered blocks. The receiver calculates coefficients for use by the adaptive filter on an $j^{th}$ received block as a function of (i) error estimates associated with an $(j-D-1)^{th}$ filtered block, where D is a positive integer representing a number of blocks, and where j is a positive integer greater than (D−1); and (ii) delay compensation terms dependent on an estimate of a difference between coefficients used by the adaptive filter on an $(j-D-1)^{th}$ received block and coefficients used by the adaptive filter on an $(j-1)^{th}$ received block

20 Claims, 7 Drawing Sheets

(51) Int. Cl.
　　　*H04B 10/2569*　　(2013.01)
　　　*H04B 10/67*　　　(2013.01)
　　　*H04B 10/532*　　(2013.01)
　　　*H04B 10/69*　　　(2013.01)

(56) References Cited

U.S. PATENT DOCUMENTS

| | | | | |
|---|---|---|---|---|
| 9,094,122 | B2* | 7/2015 | Roberts | H04B 10/2569 |
| 9,590,731 | B2 | 3/2017 | Roberts et al. | |
| 2013/0209089 | A1* | 8/2013 | Harley | H04B 10/5561 398/25 |
| 2014/0086594 | A1* | 3/2014 | Xie | H04B 10/6161 398/208 |

OTHER PUBLICATIONS

Douglas, et al., "A Pipelined LMS Adaptive FIR Filter Architecture Without Adaptation Delay", IEEE Transactions on Signal Processing, vol. 46, No. 3, Mar. 1998.

Kimijima, et al., "An Effective Architecture of the Pipelined LMS Adaptive Filters", IEICE Trans. Fundamentals, vol. E82-A, No. 8, Aug. 1999.

Long, et al., "Corrections to "The LMS Algorithm with Delayed Coefficient Adaptation"", IEEE Transactions on Signal Processing, vol. 40, No. 1, Jan. 1992.

Mahfuz, et al., "A High-Throughput DLMS Adaptive Algorithm", IEEE, 2005.

Matsubara, et al., "Pipelined LMS Adaptive Filter Using a New Look-Ahead Transformation", IEEE Transactions on Circuits and Systems-II: Analog and Digital Signal Processing, vol. 46, No. 1, Jan. 1999.

Okello, et al., "A New Architecutre for Implementing Pipelined FIR ADF Based on Classification of Coefficients", IEEE Transactions on Circuits and Systems-II: Analog and Digital Signal Processing, vol. 49, No. 6, Jun. 2002.

Poltmann, "Conversion of the Delay LMS Algorithm into the LMS Algorithm", IEEE Signal Processing Letters, vol. 2, No. 12, Dec. 1995.

Proakis, et al., "Digital Communications", Fifth Edition, McGraw-Hill Higher Education, 2008.

Van, et al., "An Efficient Systolic Architecture for the DLMS Adaptive Filter and Its Applications", IEEE Transactions on Circuits and Systems-II: Analog and Digital Signal Processing, vol. 48, No. 4, Apr. 2001.

* cited by examiner with the (j−D−1)$^{th}$ filtered block using the
FEEDBACK EQUALIZATION WITH DELAY COMPENSATION

TECHNICAL FIELD

This document relates to the technical field of communications.

BACKGROUND

In a communication network, a transmitter may transmit a signal over a communication channel to a receiver, where the signal is representative of digital information in the form of symbols or bits. The receiver may process the signal received over the communication channel to recover estimates of the symbols or bits. Various components of the communication network may contribute to signal degradation, such that the signal received at the receiver comprises a degraded version of the signal that was generated at the transmitter. In the case of an optical signal, degradation or distortion may be caused by polarization mode dispersion (PMD), polarization dependent loss or gain (PDL or PDG), state of polarization (SOP) rotation, amplified spontaneous emission (ASE), wavelength-dependent dispersion or chromatic dispersion (CD), and other effects. The degree of signal degradation may be characterized by a signal-to-noise ratio (SNR), or alternatively by a noise-to-signal ratio (NSR).

The degradation and/or distortion observed in the received signal depends on the condition of the communication channel over which the signal is received. The condition of the communication channel may be characterized by the channel response, which may vary over time. By tracking time-varying changes in the channel response, it may be possible to compensate for those changes in the received signal, a process generally referred to as channel equalization.

SUMMARY

According to a broad aspect, a receiver device comprises a communication interface configured to detect a received signal comprising a degraded version of a transmitted signal, the received signal suffering from degradations incurred over a communication channel. The receiver device is configured to apply an adaptive filter to a series of received blocks of a digital representation of the received signal, thereby generating respective filtered blocks. The receiver device is further configured to calculate coefficients for use by the adaptive filter on a j$^{th}$ received block as a function of (i) error estimates associated with a (j−D−1)$^{th}$ filtered block, wherein D is a positive integer representing a number of blocks, and wherein j is a positive integer greater than (D−1); and (ii) delay compensation terms dependent on an estimate of a difference between coefficients used by the adaptive filter on a (j−D−1)$^{th}$ received block and coefficients used by the adaptive filter on a (j−1)$^{th}$ received block.

According to some examples, the receiver device is configured to calculate the delay compensation terms using the (j−D−1)$^{th}$ received block.

According to some examples, the delay compensation terms are based on a covariance of the (j−D−1)$^{th}$ received block or an approximation thereof.

According to some examples, the receiver device is configured to generate the approximation using a statistical estimate of the covariance over a plurality of the received blocks.

According to some examples, the receiver device is configured to calculate frequency-domain representations of the coefficients for use by the adaptive filter on the j$^{th}$ received block using frequency-domain representations of the delay compensation terms, and to apply the adaptive filter to the series of received blocks in the frequency-domain.

According to some examples, the received signal is representative of symbols, and the receiver device is configured to decode estimates of the symbols represented by the (j−D−1)$^{th}$ filtered block, and to calculate the error estimates associated with the (j−D−1)$^{th}$ filtered block using the decoded estimates of the symbols.

According to some examples, the symbols include one or more predetermined symbols.

According to some examples, the communication channel comprises an optical communication channel.

According to some examples, the receiver device is configured to apply the adaptive filter to a first subset of the series of received blocks using coefficients calculated as a function of respective delay compensation terms, and apply the adaptive filter to a second subset of the series of received blocks using coefficients that are independent of any delay compensation terms.

DETAILED DESCRIPTION

Figure 1:
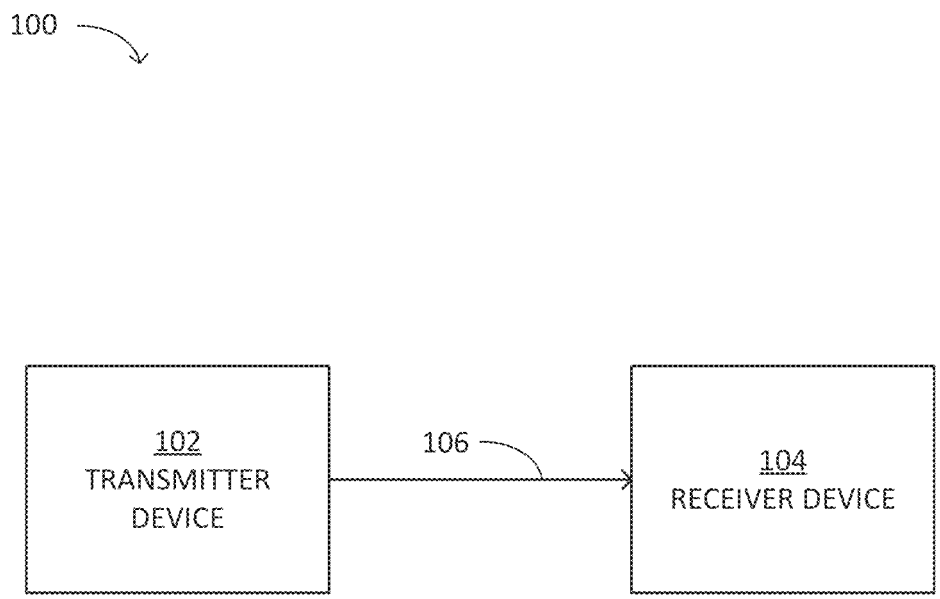
FIG. 1 illustrates an example communication network in accordance with some examples of the technology disclosed herein.

FIG. 1 illustrates an example communication network 100, in accordance with some examples of the technology disclosed herein.

The communication network 100 may comprise at least one transmitter device 102 and at least one receiver device 104, where the transmitter device 102 is capable of transmitting signals over a communication channel, such as a communication channel 106, and where the receiver device 104 is capable of receiving signals over a communication channel, such as the communication channel 106. According to some examples, the transmitter device 102 is also capable of receiving signals. According to some examples, the receiver device 104 is also capable of transmitting signals. Thus, one or both of the transmitter device 102 and the receiver device 104 may be capable of acting as a transceiver. According to one example, the transceiver may comprise a modem.

The communication network 100 may comprise additional elements not illustrated in FIG. 1. For example, the communication network 100 may comprise one or more additional transmitter devices, one or more additional receiver devices, and one or more other devices or elements involved in the communication of signals in the communication network 100.

According to some examples, the signals that are transmitted and received in the communication network 100 may comprise any combination of electrical signals, optical signals, and wireless signals. For example, the transmitter device 102 may comprise a first optical transceiver, the receiver device 104 may comprise a second optical transceiver, and the communication channel 106 may comprise an optical communication channel. According to one example, one or both of the first optical transceiver and the second optical transceiver may comprise a coherent modem.

Each optical communication channel in the communication network 100 may include one or more links, where each link may comprise one or more spans, and each span may comprise a length of optical fiber and one or more optical amplifiers.

Where the communication network 100 involves the transmission of optical signals, the communication network 100 may comprise additional optical elements not illustrated in FIG. 1, such as wavelength selective switches, optical multiplexers, optical de-multiplexers, optical filters, and the like.

Various elements and effects in the communication network 100 may result in the degradation of signals transmitted between different devices. Thus, a signal received at the receiver device 104 may comprise a degraded version of a signal transmitted by the transmitter device 102, where the degradation is caused by various impairments in the communication channel 106. For example, where the communication channel 106 is an optical communication channel, the signal transmitted by the transmitter device 102 may be degraded by polarization mode dispersion (PMD), polarization dependent loss or gain (PDL or PDG), state of polarization (SOP) rotation, amplified spontaneous emission (ASE) noise, and wavelength-dependent dispersion or chromatic dispersion (CD), nonlinear noise from propagation through fiber, and other effects. The degree of signal degradation may be characterized by a signal-to-noise ratio (SNR), or alternatively by a noise-to-signal ratio (NSR). The signals transmitted in the communication network 100 may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

The receiver device 104 may receive a communication signal transmitted over the communication channel 106 from the transmitter device 102, where the communication signal conveys symbols that are representative of digital information. At the receiver device 104, the decoded symbols that are recovered may comprise noisy versions of the symbols that were originally transmitted by the transmitter device 102.

Figure 2:
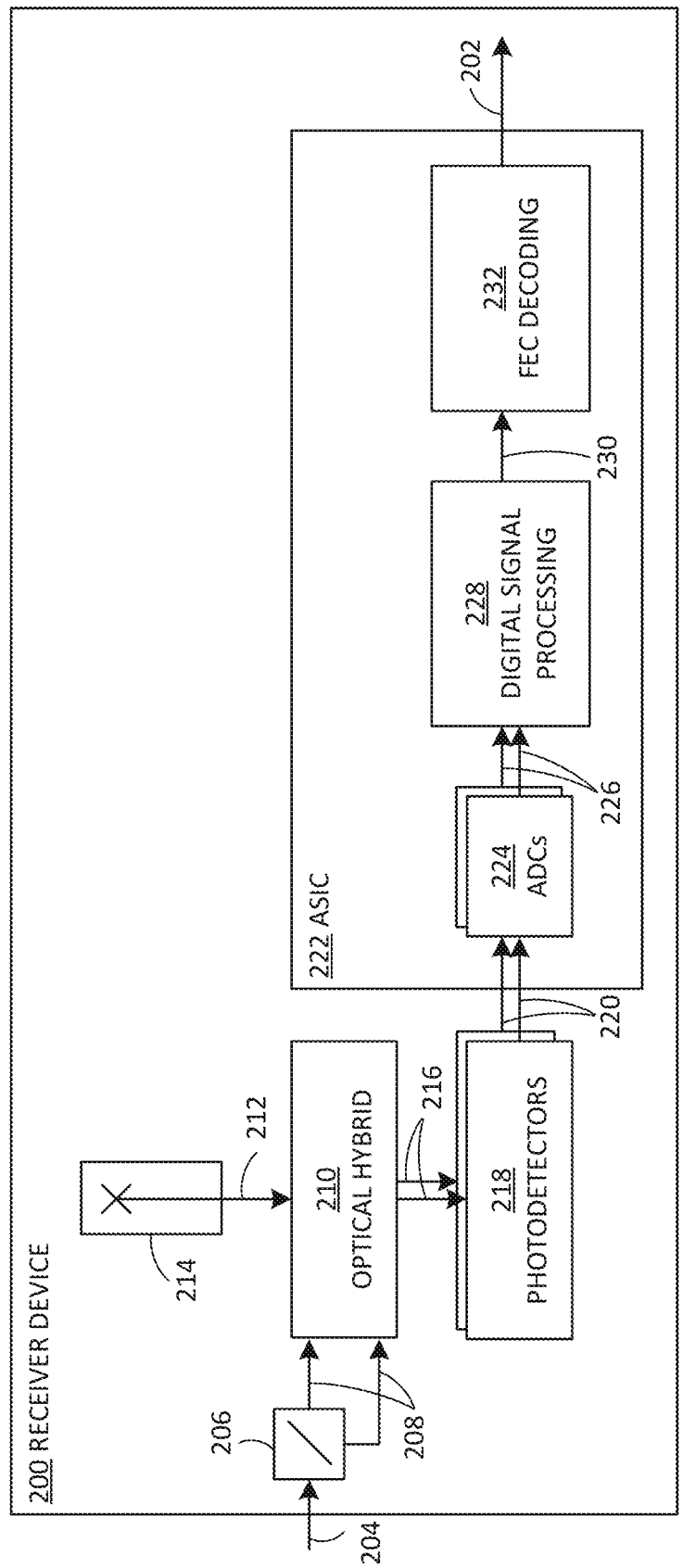
FIG. 2 illustrates an example receiver device in accordance with some examples of the technology disclosed herein.

FIG. 2 illustrates an example receiver device 200, in accordance with some examples of the technology disclosed herein. The receiver device 200 is an example of the receiver device 104. The receiver device 200 may comprise additional components that are not described in this document.

The receiver device 200 is configured to receive an optical signal 204, which may comprise a degraded version of an optical signal generated by a transmitter device, such as the transmitter device 102. The optical signal generated by the transmitter device may be representative of information bits (also referred to as client bits) which are to be communicated to the receiver device 200. The optical signal generated by the transmitter device may be representative of a stream of symbols.

According to some examples, the transmitter device may be configured to apply forward error correction (FEC) encoding to the client bits to generate FEC-encoded bits, which may then be mapped to one or more streams of data symbols. The optical signal transmitted by the transmitter device may be generated using any of a variety of techniques such as polarization-division multiplexing (PDM), single polarization modulation, modulation of an unpolarized carrier, mode-division multiplexing, spatial-division multiplexing, Stokes-space modulation, polarization balanced modulation, and the like.

The receiver device 200 is configured to recover corrected client bits 202 from the received optical signal 204. The receiver device 200 may comprise a polarizing beam splitter 206 configured to split the received optical signal 204 into polarized components 208. According to one example, the polarized components 208 may comprise orthogonally polarized components corresponding to an X polarization and a Y polarization. An optical hybrid 210 is configured to process the components 208 with respect to an optical signal 212 produced by a laser 214, thereby resulting in optical signals 216. Photodetectors 218 are configured to convert the optical signals 216 output by the optical hybrid 210 to analog signals 220. According to one example, the analog signals 220 may comprise four signals corresponding, respectively, to the dimensions XI, XQ, YI, YQ, where XI and XQ denote the in-phase and quadrature components of the X polarization, and YI and YQ denote the in-phase and quadrature components of the Y polarization. Together, elements such as the beam splitter 206, the laser 214, the optical hybrid 210 and the photodetectors 218 may form a communication interface configured to receive optical signals from other devices in a communication network, such as the network 100.

The receiver device 200 may comprise an application specific integrated circuit (ASIC) 222. The ASIC 222 may comprise analog-to-digital converters (ADCs) 224 which are configured to sample the analog signals 220, and to generate respective digital signals 226. Although illustrated as comprised in the ASIC 222, in an alternate implementation the ADCs 224 or portions thereof may be separate from the ASIC 222. The ADCs 224 sample the analog signals 220 periodically at a sample rate that is based on a signal received from a voltage-controlled oscillator (VCO) at the receiver device 200 (not shown).

The ASIC 222 is configured to apply digital signal processing 228 to the digital signals 226, as will be described in more detail with respect to FIG. 3. The digital signal processing 228 may comprise equalization processing designed to compensate for a variety of channel impairments, such as CD, SOP rotation, PMD including group delay (GD) and differential group delay (DGD), PDL or PDG, and other effects. The digital signal processing 228 may further comprise carrier recovery processing, which includes calculating an estimate of carrier frequency offset (i.e., the difference between the frequency of the transmitter laser and the frequency of the receiver laser 214). According to some examples, the digital signal processing 228 may further comprise operations such as multiple-output (MIMO) filtering, clock recovery, and FDM subcarrier demultiplexing. The digital signal processing 228 further comprises symbol-to-bit demapping (or decoding) using a decision circuit, such that signals 230 output by the digital signal processing 228 are representative of bit estimates. Where the received optical signal 204 is representative of symbols comprising FEC-encoded bits generated as a result of applying FEC encoding to client bits, the signals 230 may further undergo FEC decoding 232 to recover the corrected client bits 202.

According to some examples, the equalization processing implemented as part of the digital signal processing 228 may comprise one or more equalizers, where each equalizer is configured to compensate for impairments in the channel response. In general, an equalizer applies a filter to an input signal to generate an output signal that is less degraded than the input signal. The filter is characterized by compensation coefficients which may be incrementally updated from time to time, always with the goal of reducing the degradation observed in the output signal.

According to some examples, the equalization processing may comprise an equalizer filter which is designed to apply a first-order dispersive function to at least partially compensate for slowly changing channel impairments, such as CD. For example, compensation coefficients may be calculated through firmware using the estimated CD during start-up of the receiver device (also referred to the acquisition stage), and those coefficients may be applied to received signals (either by convolution in the time domain, or by multiplication in the frequency domain), thereby resulting in processed signals which are, at least partially, compensated for CD. This equalizer filter may be referred to as "static" because the updating of its compensation coefficients is relatively infrequent. For example, the coefficients may be periodically updated (e.g., once every second) based on information obtained downstream during the digital signal processing. The slow rate of change of the compensation coefficients means that the static equalizer filter may only be capable of tracking and compensating for relatively slow changes in the channel response, and not fast changes. For example, the static equalizer filter may be able to compensate for changes in CD, which are typically at a rate on the order of <1 Hz, but the static equalizer filter may be unable to compensate for changes in SOP rotation, which typically happen much more quickly.

According to some examples, the equalization processing may comprise an additional equalizer filter which uses feedback to compensate for relatively fast changes in the channel response, such as SOP changes, PMD changes, PDL changes, small amounts of CD, and analog characteristics of the transmitter and receiver, which change at a rate on the order of kHz. For example, a standard feedback equalizer may compensate for impairments varying at a rate of approximately 100 kHz.

According to some examples, feedback equalization may rely on a Least Mean Squares (LMS) feedback loop. Techniques for LMS equalization in the frequency domain are described, for example, in U.S. Pat. No. 8,005,368 to Roberts et al., U.S. Pat. No. 8,385,747 to Roberts et al., U.S. Pat. No. 9,094,122 to Roberts et al., and U.S. Pat. No. 9,590,731 to Roberts et al. The technology proposed in this document will be described in the context of frequency-domain LMS equalization. However, it should be understood that variations of the proposed technology may be applied to other equalization techniques, such as adaptive Wiener filtering using a constant modulus algorithm (CMA) or an affine projection algorithm (APA) or a recursive least squares (RLS) algorithm. Furthermore, the proposed technology may also be implemented using blocks in the time domain.

Figure 3:
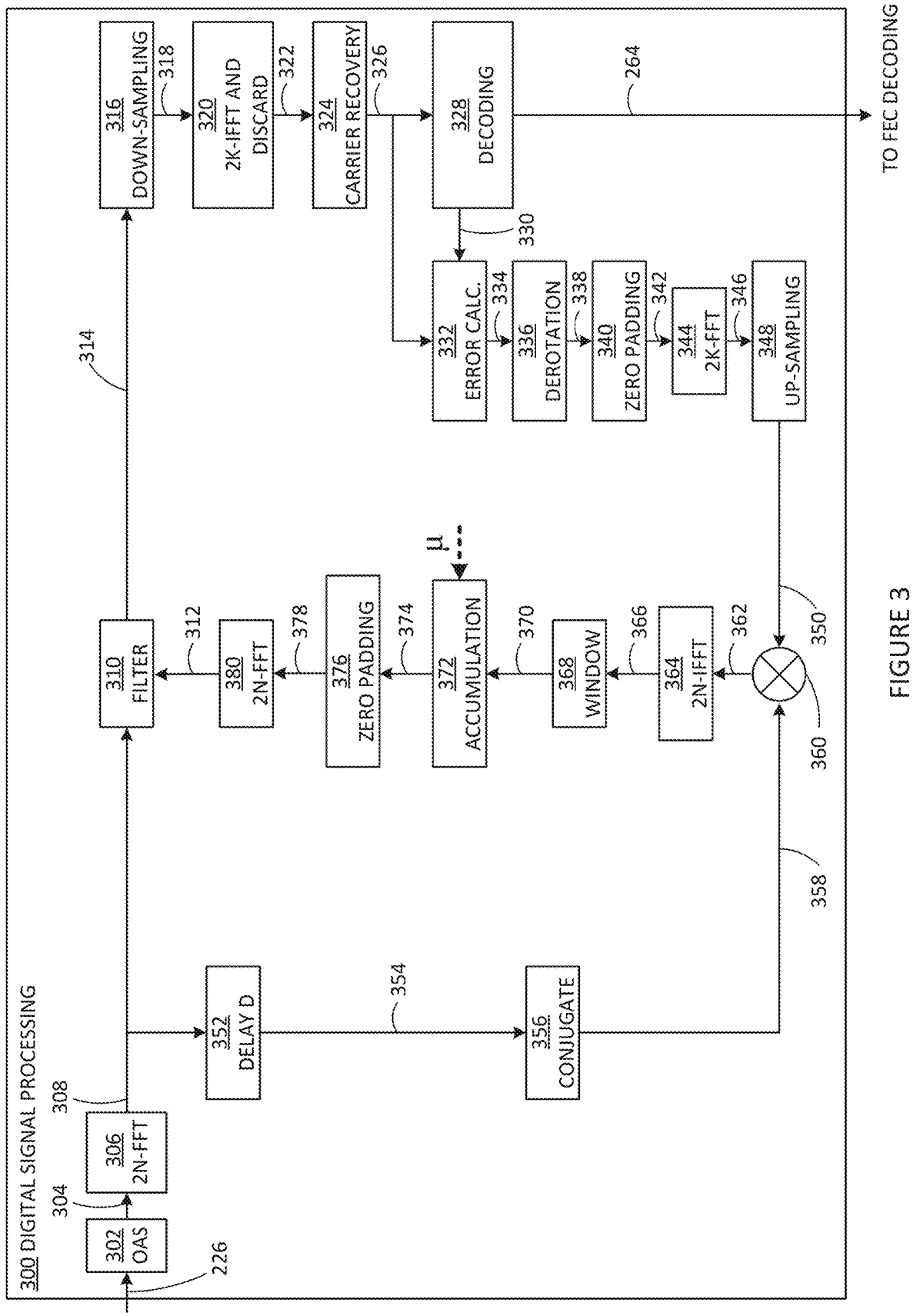
FIG. 3 illustrates example digital signal processing for feedback equalization.

FIG. 3 illustrates example digital signal processing 300 for feedback equalization. The digital signal processing 300 is an example of the digital signal processing 228 shown in FIG. 2.

For ease of explanation, equalization processing will be described for a single polarization (X) while ignoring cross-polarization effects. However, it should be understood that similar processing may be used for additional dimensions of a multidimensional signal. The technology described in this document may be applied to some or all of these dimensions.

The digital signals 226 corresponding to the X polarization may be denoted by a time-varying vector x. An overlap and save (OAS) operation 302 may be applied to the digital signals 226, and the resulting output time-domain signals 304 may then undergo a fast Fourier transform (FFT) operation 306 to generate discrete frequency-domain signals 308. A FFT of length 2N (also referred to as a FFT matrix of size 2N×2N) is herein denoted by $F_{2N \times 2N}$ or 2N-FFT, wherein N denotes a positive integer. The corresponding inverse FFT (IFFT) of length 2N (also referred to as an IFFT matrix of size 2N×2N) is herein denoted by $F_{2N \times 2N}^{-1}$ or 2N-IFFT. The FFT (and IFFT) operations described throughout this document may alternatively be performed using discrete Fourier transform (DFT) operations.

For the purposes of the examples described herein, a matrix M comprising R rows and C columns is generally denoted by $M_{R \times C}$, while a vector V comprising T terms is generally denoted by $V_T$. The notation diagvec(M) denotes a vector consisting of the diagonal terms of the matrix M. The notation diagmat(V) denotes a diagonal matrix with diagonal terms consisting of the terms of the vector V. The notation firstcol(M) denotes the first or leftmost column of the matrix M. The notation midcol(M) denotes the middle column of the matrix M. The notation circshift(V, p) denotes a circular shift of the vector V by an integer p. The notation Mt denotes the Hermitian of the matrix M.

According to some examples, a given one of the time-domain signals 304 may be expressed in the form of a circulant matrix denoted by $\tilde{x}_{2N \times 2N}$. Due to the circulant form of $\tilde{x}_{2N \times 2N}$, it follows that $(F_{2N \times 2N} \tilde{x}_{2N \times 2N} F_{2N \times 2N}^{-1})$ is a diagonal matrix, herein denoted by $X_{2N \times 2N}$. By definition, the non-diagonal terms of the diagonal matrix $X_{2N \times 2N}$ are equal to zero. The 2N diagonal terms of $X_{2N \times 2N}$ may be calculated by taking the 2N-FFT of the first column of the circulant matrix $\tilde{x}_{2N \times 2N}$. In other words, diagvec($X_{2N \times 2N}$)= $F_{2N \times 2N}$ (firstcol[$\tilde{x}_{2N \times 2N}$]).

The discrete frequency-domain signals 308 are made up of blocks, also referred to as FFT blocks, where each block comprises the 2N diagonal elements of a respective matrix $X_{2N \times 2N}$, each diagonal element comprising a complex value representing the in-phase and quadrature components of the frequency-domain signal at a different frequency bin. The diagonal matrix corresponding to the $j^{th}$ block of the discrete frequency-domain signals 308 is denoted by $X_{2N \times 2N}(j)$.

Referring back to FIG. 3, the digital signal processing 300 involves applying a filter 310 to the discrete frequency-domain signals 308, thereby resulting in respective filtered signals 314. The filter 310 is characterized by compensation coefficients 312 which may be expressed as a complex-valued vector $H_{2N}$. As will be described in greater detail herein, the compensation coefficients 312 may be periodically and incrementally adjusted, such that $H_{2N}$ takes on different values over time. The adjustments may be designed to minimize the errors on the symbols that are currently being decoded at the receiver device 200. The values of the compensation coefficients 312 applied to the $j^{th}$ block of the discrete frequency-domain signals 308 are denoted by $H_{2N}$(j). The filtered signals 314 may be calculated from the product of the signals 308 and the respective compensation coefficients 312 applied by the filter 310, such that $j^{th}$ block of the filtered signals 314 comprises the 2N diagonal terms of $X_{2N \times 2N}(j)H_{2N}(j)$, that is diagvec($X_{2N \times 2N}(j)H_{2N}(j)$).

According to some examples, the filtered signals 314 may undergo a down-sampling operation 316 to generate respective down-sampled signals 318. As a result of the down-sampling operation 316, the $j^{th}$ block of the down-sampled signals 318 comprises 2K elements, where K is a positive integer, and where K<N.

According to some examples, the down-sampled signals 318 may undergo a 2K-IFFT and discard operation 320 to generate respective time-domain signals 322. Where the OAS operation 302 is a 50% OAS, the discard applied at 320 may discard half of the 2K elements of the down-sampled signals 318 following the 2K-IFFT.

According to some examples, the time-domain signals 322 may undergo a carrier recovery operation 324 to generate respective signals 326 which are compensated for laser frequency offset and linewidth. A decision circuit may then apply a decoding operation 328 to the signals 326 to recover symbol estimates (represented by signals 330) and corresponding bit estimates (represented by the signals 264). According to some examples, the decoding operation 328 may comprise soft decoding. The signals 264 may subsequently undergo FEC decoding, such as the FEC decoding 232 described with respect to FIG. 2.

The LMS feedback loop is designed to minimize error in the symbol estimates. According to some examples, the error may be calculated by an error calculation operation 332 that determines the difference between the signals 326 and the signals 330, thereby generating error signals 334. The error signals 334 may be expressed as:

$$\hat{e}_K(j) = \hat{d}_K(j) - \Phi_{K \times K}(j) W_{K \times 2K}^{01} F_{2K \times 2K}^{-1} U_{2N \times 2K}^\dagger X_{2N \times 2N}(j) H_{2N}(j) \quad [1]$$

where $\hat{e}_K(j)$ is a time-domain vector denoting the error signals for the $j^{th}$ block (corresponding to the signals 334), where $\hat{d}_K(j)$ is a time-domain vector denoting the signals representing the decoded symbol estimates of the $j^{th}$ block (corresponding to the signals 330), where $\Phi_{K \times K}(j)$ denotes a diagonal carrier recovery matrix for the $j^{th}$ block (corresponding to the operation 324), where $W_{K \times 2K}^{01} = [0_{N \times N} 1_{N \times N}]$ denotes a discard matrix which discards the first half of 2K input samples and where $F_{2K \times 2K}^{-1}$ denotes a 2K-IFFT matrix (corresponding to the operation 320), and where $U_{2N \times 2K}^\dagger$ denotes a down-sampling matrix which converts 2N input samples to 2K output samples (corresponding to the operation 316).

According to some examples, the digital signals 226 may be representative a stream of symbols comprising payload symbols and predetermined training symbols distributed over time. In such cases, the error calculation operation 332 may generate the error signals 334 by comparing the signals 326 to signals representative of the known training symbols.

In order to make use of the signals 334 representing the error vector $\hat{e}_K(j)$, the effects of the operations 316, 320, and 324 are reversed using a series of operations 336, 340, 344, and 348. That is, a derotation operation 336 is applied to the signals 334 to reverse the effects of the carrier recovery operation 324, thereby resulting in respective signals 338. A zero padding operation 340 is applied to the signals 338 to reverse the effects of the discard applied by the operation 320, thereby resulting in respective signals 342. A 2K-FFT operation 344 is applied to the signals 342 to reverse the effects of the 2K-IFFT operation 320, thereby resulting in respective signals 346. Finally, an up-sampling operation 348 is applied to the signals 346 to reverse the effects of the down-sampling operation 316, thereby resulting in respective signals 350. The signals 350 may be expressed as:

$$E_{2N}(j) = U_{2N \times 2K} F_{2K \times 2K} (W_{K \times 2K}^{01})^\dagger \Phi_{K \times K}^\dagger(j) \hat{e}_K(j) \quad [2]$$

where $E_{2N}(j)$ is a frequency-domain vector denoting the error signals for the $j^{th}$ block (corresponding to the signals 350), where $U_{2N \times 2K}$ denotes an up-sampling matrix which converts 2K input samples to 2N output samples (corresponding to the operation 348), where $F_{2K \times 2K}$ denotes a 2K-FFT matrix (corresponding to the operation 344), where $(W_{K \times 2K}^{01})^\dagger$ denotes a zero padding matrix which pads K samples with K zeros (corresponding to the operation 340), and where $\Phi_{K \times K}^\dagger(j)$ denotes a derotation matrix for the $j^{th}$ block (corresponding to the operation 336).

As a result of the feedback design of the digital signal processing 300, the compensation coefficients 312 that are applied by the filter 310 for a given FFT block are dependent on signals 350 that are calculated from a previous FFT block. Ideally, the filter that is applied to the $j^{th}$ FFT block would use compensation coefficients calculated from the immediately preceding FFT block (j−1). However, in reality, the time required to generate the error signals 350 leads to a delay in the updating of the compensation coefficients. For example, the compensation coefficients 312 that are applied by the filter 310 for FFT block j may have been calculated using an FFT block (j−D−1), where D is a positive integer denoting a number of FFT blocks. Equivalently, the compensation coefficients 312 that are applied by the filter 310 for FFT block (j+1) may have been calculated using an FFT block (j−D). According to one example, D=50.

The compensation coefficients 312 are dependent on the product of the error signals 350 associated with a given FFT block and the conjugate of the signals 308 for that same FFT block. The following example will consider the compensation coefficients 312 to be applied to the $j^{th}$ FFT block of the signals 308, which are calculated based on signals associated with the (j−D−1)$^{th}$ FFT block.

The error signals 350 experience the delay D as a result of the inherent delays associated with the operations 316, 320, 324, 328, 332, 336, 340, 344, and 348. The same delay D may be applied to the signals 308 by the delay operation 352, thereby resulting in respective delayed signals 354. A conjugate operation 356 may be applied to the signals 354, thereby resulting in respective signals 358 which may be expressed as $X_{2N \times 2N}^\dagger(j-D-1)$, which is the Hermitian of $X_{2N \times 2N}(j-D-1)$. According to some examples, the operations 352 and 356 may be performed in the opposite order to that illustrated in FIG. 3.

A multiplication operation 360 may be applied to the signals 358 and the signals 350, thereby resulting in respective signals 362 which may be expressed as the product $X_{2N \times 2N}^\dagger(j-D-1)E_{2N}(j-D-1)$. A 2N-IFFT operation 364 may be applied to the signals 362, thereby resulting in respective time-domain signals 366. A windowing operation 368 may be applied to the signals 366, thereby resulting in respective signals 370 which may have improved SNR. Such windowing is described, for example, in U.S. Pat. No. 8,005,368 to Roberts et al., U.S. Pat. No. 8,385,747 to Roberts et al., U.S. Pat. No. 9,094,122 to Roberts et al., and U.S. Pat. No. 9,590,731 to Roberts et al. Other filtering may be used instead of or in addition to the time-domain window 368.

An accumulation operation 372 may be applied to the signals 370, thereby resulting in respective signals 374, which may be expressed as:

$$\hat{h}_L(j) = \hat{h}_L(j-1) + \mu(W^{10}_{2N \times L})^\dagger F^{-1}_{2N \times 2N} X^\dagger_{2N \times 2N}(j-D-1)E_{2N}(j-D-1) \quad [3]$$

where $\hat{h}_L(j)$ is a vector denoting the time-domain compensation coefficients for the $j^{th}$ block, where $\hat{h}_L(j-1)$ is a vector denoting the time-domain compensation coefficients for the $(j-1)^{th}$ block, where $\mu$ is a real number in the range [0 . . . 2], often implemented as a negative power of two, referred to as the gain factor, where $$(W^{10}_{2N \times L})^\dagger = \begin{bmatrix} I_{L \times L} \\ 0_{(2N-L) \times L} \end{bmatrix}^\dagger$$

is a matrix which windows the signals 366 from length 2N to length L (corresponding to the operation 368), where I denotes an identity matrix, and where $$F^{-1}_{2N \times 2N}$$

denotes the 2N-IFFT matrix (corresponding to the operation 364).

A zero padding operation 376 may be applied to the signals 374, thereby resulting in respective signals 378. A 2N-FFT operation 380 may be applied to the signals 378, thereby resulting in the respective signals 312, which may be expressed as:

$$H_{2N}(j) = H_{2N}(j-1) + \mu F_{2N \times 2N} W^{10}_{2N \times L}(W^{10}_{2N \times L})^\dagger \quad [4]$$
$$F^{-1}_{2N \times 2N} X^\dagger_{2N \times 2N}(j-D-1)E_{2N}(j-D-1)$$

where $$H_{2N}(j) = F_{2N \times 2N} W^{10}_{2N \times L} \hat{h}_L(j)$$

is a vector denoting the frequency-domain compensation coefficients for the $j^{th}$ block (corresponding to the current values of the signals 312, where $$H_{2N}(j-1) = F_{2N \times 2N} W^{10}_{2N \times L} \hat{h}_L(j-1)$$

is a vector denoting the frequency-domain compensation coefficients for the $(j-1)^{th}$ block (corresponding to the values of the signals 312 for the immediately preceding clock cycle), where $F_{2N \times 2N}$ denotes the 2N-FFT matrix (corresponding to the operation 380), and where $$W^{10}_{2N \times L}$$

is a zero-padding matrix corresponding to the operation 376).

It is apparent in Equation 4 that the compensation coefficients used for the $j^{th}$ FFT block, $H_{2N}(j)$, are dependent on error values $E_{2N}(j-D-1)$ that are outdated by the delay D. As a result of this delay, a standard feedback equalizer such as the LMS feedback equalizer illustrated in FIG. 3 may be unable to track and compensate for relatively fast changes in the channel response. This may limit the SNR that is achievable, for example, in the presence of SOP transients.

For a FFT block being filtered at a current clock cycle n, it may be of interest to apply compensation coefficients that have been calculated using information from the most recent clock cycle (j−1), rather than using stale information from an older clock cycle (j−D−1). In other words, rather than $H_{2N}(j)$ being dependent on $X^\dagger_{2N \times 2N}(j-D-1)$ and $E_{2N}(j-D-1)$, it may be of interest to make $H_{2N}(j)$ effectively dependent on $X^\dagger_{2N \times 2N}(j-1)$ and $E_{2N}(j-1)$, thereby compensating for the effect of the delay D on the value of $H_{2N}(j)$. As will now be described in more detail, this delay compensation may be achieved using a series of processing steps designed to apply an appropriate adjustment to the compensation coefficients $H_{2N}(j)$. Algebraically, compensation for the delay D in Equation 4 may be achieved by adding a vector $A_{2N}(j)$ to the error vector $E_{2N}(j-D-1)$, as expressed in Equation 5:

$$H_{2N}(j) = H_{2N}(j-1) + \mu F_{2N \times 2N} W^{10}_{2N \times L}(W^{10}_{2N \times L})^\dagger \quad [5]$$
$$F^{-1}_{2N \times 2N} X^\dagger_{2N \times 2N}(j-D-1)[E_{2N}(j-D-1) + A_{2N}(j)]$$

where the vector $A_{2N}(j)$ is expressed as:

$$A_{2N}(j) = \alpha U_{2N \times 2K} F_{2K \times 2K}(W^{01}_{K \times 2K})^\dagger \quad [6]$$
$$W^{01}_{K \times 2K} F^{-1}_{2K \times 2K} U^\dagger_{2N \times 2K} X_{2N \times 2N}(j-D-1) \Delta H_{2N}(j)$$

where $\alpha$ is a real number in the range [0 . . . 1] reflecting the degree of delay compensation, and where $\Delta H_{2N}(j)$ is a vector expressed as:

$$\Delta H_{2N}(j) = H_{2N}(j-D-1) - H_{2N}(j-1). \quad [7]$$

The term $$F_{2K \times 2K}(W^{01}_{K \times 2K})^\dagger W^{01}_{K \times 2K} F^{-1}_{2K \times 2K}$$

in Equation 6 may be simplified to $$\frac{1}{2} I_{2K \times 2K},$$

where I denotes an identity matrix. Furthermore, in the event that the roll-off factor of the pulse shaping (e.g., the product of transmitter filtering and receiver filtering which, in the case of matched filtering, may comprise, for example, the product of two root raised cosine filters) is close to zero, then $$U_{2N \times 2K} U_{2N \times 2K}^\dagger$$

may also be approximated by an identity matrix of $I_{2N \times 2N}$. Under these circumstances, the vector $A_{2N}(j)$ may be simplified to $$A_{2N}(j) = \frac{1}{2} \alpha X_{2N \times 2N}^\dagger (j-D-1) X_{2N \times 2N}(j-D-1) \Delta H_{2N}(j),$$

and Equation 5 may be rewritten as:

$$H_{2N}(j) = H_{2N}(j-1)$$

$$H_{2N}(j) = H_{2N}(j-1) + \mu F_{2N \times 2N} W_{2N \times L}^{10} (W_{2N \times L}^{10})^\dagger \quad [8]$$

$$F_{2N \times 2N}^{-1} \left[ X_{2N \times 2N}^\dagger (j-D-1) E_{2N}(j-D-1) + \right.$$

$$\left. \frac{1}{2} \alpha X_{2N \times 2N}^\dagger (j-D-1) X_{2N \times 2N}(j-D-1) \Delta H_{2N}(j) \right]$$

The vector $A_{2N}(j)$ is designed to compensate for the difference between $H_{2N}(j-D-1)$ and $H_{2N}(j-1)$, thereby compensating for the presence of the delay D in Equation 5. In other words, the vector $A_{2N}(j)$ comprises delay compensation terms which are used to modify the filter coefficients $H_{2N}(j)$ to achieve a more up-to-date equalization of the incoming signals. Notably, in the event that $\alpha=0$, there is no delay compensation applied (i.e., $A_{2N}(j)=0$ and Equation 8 is identical to Equation 4). In that event that $\alpha=1$, the full amount of delay compensation is applied. In practice, a may be set to a value between zero and one, such that only a portion of the full delay compensation is applied, thereby reducing the likelihood that an erroneous symbol estimate 330 will result in a large error in $H_{2N}(j)$.

A further simplification of Equation 8 may be achieved by using the statistical expectation of the covariance term $$X_{2N \times 2N}^\dagger (j-D-1) X_{2N \times 2N}(j-D-1),$$

as expressed in Equation 9:

$$H_{2N}(j) = H_{2N}(j-1) + \mu F_{2N \times 2N} W_{2N \times L}^{10} (W_{2N \times L}^{10})^\dagger \quad [9]$$

$$F_{2N \times 2N}^{-1} \left[ X_{2N \times 2N}^\dagger (j-D-1) E_{2N}(j-D-1) + \right.$$

$$\left. \frac{1}{2} \alpha \mathcal{E}\{X_{2N \times 2N}^\dagger (j-D-1) X_{2N \times 2N}(j-D-1)\} \Delta H_{2N}(j) \right]$$

where $\varepsilon\{\ \}$ denotes the expectation. According to some examples, $\varepsilon\{X_{2N \times 2N}^\dagger(j-D-1) X_{2N \times 2N}(j-D-1)\}$ may be calculated using an average covariance matrix $S_{2N \times 2N}(j)$. For example, the matrix $S_{2N \times 2N}(j)$ may be calculated using exponentially weighted sampling of the covariance matrix $X_{2N \times 2N}^\dagger(j) X_{2N \times 2N}(j)$ as expressed in Equation 10:

$$S_{2N \times 2N}(j) = \lambda S_{2N \times 2N}(j-1) + (1-\lambda) X_{2N \times 2N}^\dagger(j) X_{2N \times 2N}(j) \quad [10]$$

where $\lambda$ is a real number in the range [0 . . . 1] which denotes a weighting factor. According to another example, the average covariance matrix $S_{2N \times 2N}(j)$ may be calculated using sliding window averaging.

Where the average covariance matrix $S_{2N \times 2N}(j-D-1)$ is used in place of the expectation $$\mathcal{E}\{X_{2N \times 2N}^\dagger (j-D-1) X_{2N \times 2N}(j-D-1)\},$$

Equation 9 may be rewritten as:

$$H_{2N}(j) = \quad [11]$$

$$H_{2N}(j-1) + \mu F_{2N \times 2N} W_{2N \times L}^{10} (W_{2N \times L}^{10})^\dagger F_{2N \times 2N}^{-1} \left[ X_{2N \times 2N}^\dagger (j-D-1) \right.$$

$$\left. E_{2N}(j-D-1) + \frac{1}{2} \alpha S_{2N \times 2N}(j-D-1) \Delta H_{2N}(j) \right].$$

Equation 11 represents the frequency-domain compensation coefficients $H_{2N}(j)$ for LMS feedback equalization using statistical delay compensation.

Figure 4:
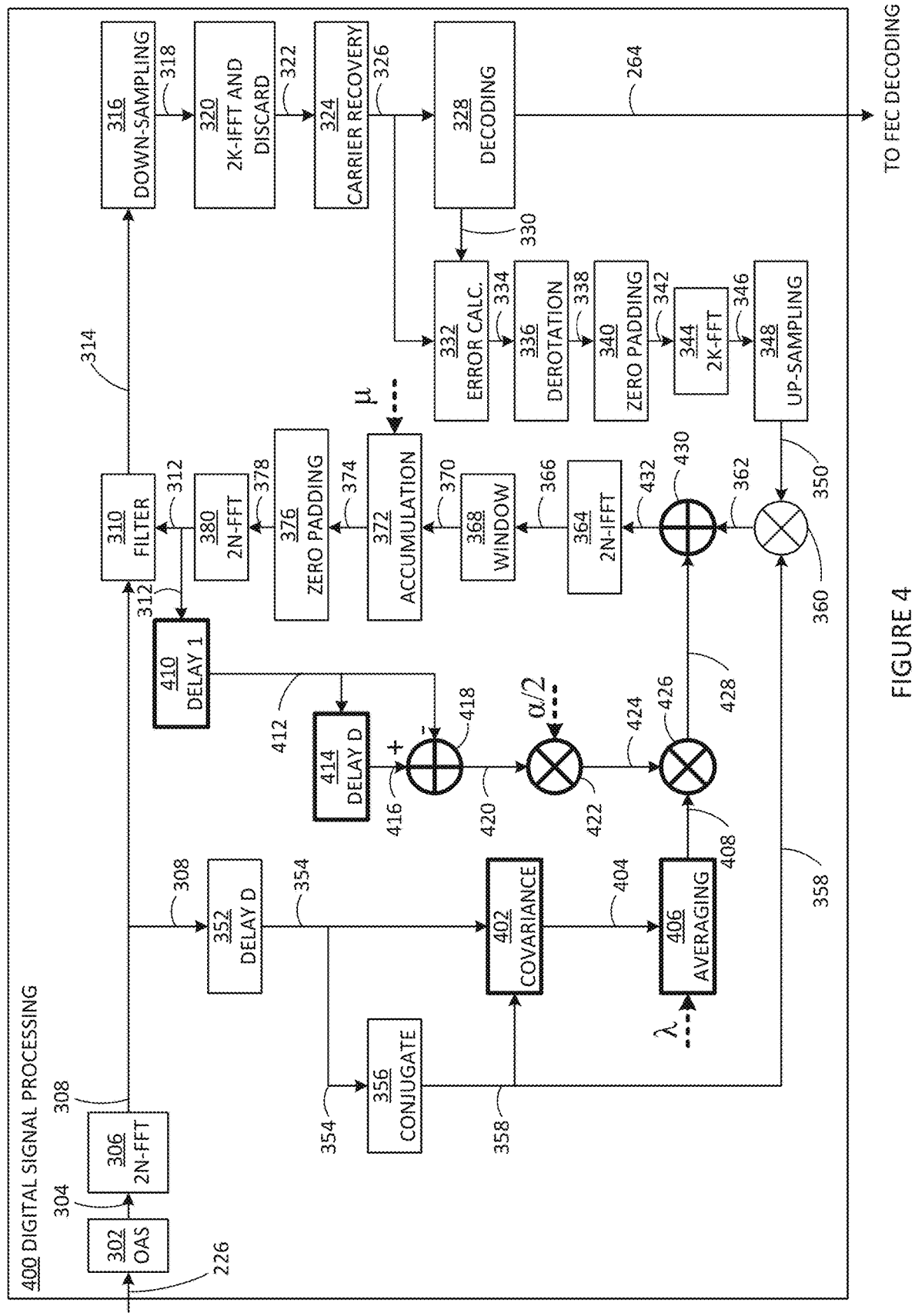
FIG. 4 illustrates digital signal processing for feedback equalization with delay compensation in accordance with a first example of the technology disclosed herein.

FIG. 4 illustrates digital signal processing 400 for feedback equalization with delay compensation in accordance with a first example of the technology disclosed herein. The digital signal processing 400 is an example of the digital signal processing 228 shown in FIG. 2. The digital signal processing 400 includes all of the processing operations of the digital signal processing 300, as well as additional processing operations designed to achieve the statistical delay compensation of Equation 11.

According to the example of FIG. 4, a covariance calculation operation 402 is applied to the delayed signals 354 and to the conjugate signals 358, thereby resulting in respective signals 404 which may be expressed as the product $X_{2N \times 2N}^\dagger(j-D-1) X_{2N \times 2N}(j-D-1)$. An averaging operation 406 may be applied to the signals 404, thereby resulting in respective signals 408 which may be expressed as $S_{2N \times 2N}^\dagger(j-D-1)$. For example, the averaging operation 406 may implement the averaging expressed in Equation 10 using the weighting factor $\lambda$.

As previously described with respect to FIG. 3, the signals 312 generated by the 2N-FFT operation 380 are representative of the frequency-domain compensation coefficients $H_{2N}(j)$. As illustrated in FIG. 4, a delay operation 410 applies a delay of one clock cycle to the signals 312, thereby resulting in respective signals 412 denoted by $H_{2N}(j-1)$. The signals 412 undergo a delay D applied by a delay operation 414, thereby resulting in respective signals 416 denoted by $H_{2N}(j-D-1)$. A difference operation 418 is applied to the signals 416 and the signals 412, thereby resulting in respective difference signals 420 which are expressed as $\Delta H_{2N}(j)$ as provided in Equation 7.

A multiplication operation 422 calculates the product of the signals 420 and the constant $\frac{1}{2}\alpha$, thereby resulting in respective signals 424 which are expressed as $$\frac{1}{2} \alpha \Delta H_{2N}(j).$$

Another multiplication operation 426 calculates the product of the signals 424 and the signals 408, thereby resulting in respective signals 428 which are expressed as $$\frac{1}{2}\alpha\Delta H_{2N}(j)S_{2N\times 2N}(j-D-1).$$

An addition operation 430 calculates the sum of the signals 428 and the signals 362, thereby resulting in respective signals 432 that are input to the 2N-IFFT operation 364. Under these circumstances, the signals 374 that are output by the accumulation operation 372 may be expressed as:

$$\hat{h}_L(j) = \qquad [12]$$
$$\hat{h}_L(j-1) + \mu(W_{2N\times L}^{10})^\dagger F_{2N\times 2N}^{-1}\left[X_{2N\times 2N}^\dagger(j-D-1)E_{2N}(j-D-1) + \frac{1}{2}\alpha S_{2N\times 2N}(j-D-1)\Delta\hat{h}_{2N}(j)\right]$$

It may be shown that, following the zero padding operation 376 and the 2N-FFT operation 380, the resulting frequency-domain signals 312, representative of the compensation coefficients $H_{2N}(j)$, are expressed as provided in Equation 11.

Alternative implementations are contemplated for achieving feedback equalization with delay compensation. Notably, the expression $S_{2N\times 2N}(j-D-1)\Delta H_{2N}(j)$ in Equation 11 requires 2N multiplications, which may be expensive to implement. Under the circumstance that the filter length L is significantly lower than 2N, that is L<<2N, another approximation of Equation 9 may be used to further reduce computational costs associated with the delay compensation.

It is noted that Equation 9 may be rewritten as follows:

$$H_{2N}(j) = H_{2N}(j-1) + \mu F_{2N\times 2N} \qquad [13]$$
$$W_{2N\times L}^{10}\left[(W_{2N\times L}^{10})^\dagger F_{2N\times 2N}^{-1} X_{2N\times 2N}^\dagger(j-D-1)E_{2N}(j-D-1) + \frac{1}{2}\alpha F_{L\times L}^{-1}\mathcal{E}\{F_{L\times L}\hat{s}_{L\times L}(j-D-1)F_{L\times L}^{-1}\}F_{L\times L}\Delta\hat{h}_L(j)\right]$$

where $\hat{s}_{L\times L}(j)$ denotes a time-domain matrix which is defined as:

$$\hat{s}_{L\times L}(j) = (W_{2N\times L}^{10})^\dagger F_{2N\times 2N}^{-1} X_{2N\times 2N}^\dagger(j)X_{2N\times 2N}(j)F_{2N\times 2N}W_{2N\times L}^{10}. \qquad [14]$$

The covariance matrix $$X_{2N\times 2N}^\dagger(j)X_{2N\times 2N}(j)$$

in Equation 14 is a diagonal matrix, so it follows that the expression $$F_{2N\times 2N}^{-1} X_{2N\times 2N}^\dagger(j)X_{2N\times 2N}(j)F_{2N\times 2N}$$

is circulant. However, as a result of the windowing operation performed by the terms $$(W_{2N\times L}^{10})^\dagger$$

and $$W_{2N\times L}^{10},$$

the matrix $\hat{s}_{L\times L}(j)$ is not circulant. A circular shift of the middle column of the matrix $\hat{s}_{L\times L}(j)$ (i.e., the column corresponding to the floor of (L/2), also denoted by $\lfloor L/2 \rfloor$) results in a corresponding circulant time-domain matrix which is denoted by $\tilde{s}_{L\times L}(j)$. Because the matrix $\tilde{s}_{L\times L}(j)$ is circulant, it follows that the expression $$F_{L\times L}\tilde{s}_{L\times L}(j)F_{L\times L}^{-1}$$

is a diagonal matrix. The diagonal terms of the matrix $$F_{L\times L}\tilde{s}_{L\times L}(j)F_{L\times L}^{-1}$$

may be determined by calculating the L-FFT of the first column of matrix $\tilde{s}_{L\times L}(j)$. Accordingly, using previously defined notation, the matrix $$F_{L\times L}\tilde{s}_{L\times L}(j)F_{L\times L}^{-1}$$

may be expressed as diagmat($F_{L\times L}$(firstcol [$\tilde{s}_{L\times L}(j)$])). Furthermore, since $\tilde{s}_{L\times L}(j)$ is generated by a circular shift of the middle column of $\hat{s}_{L\times L}(j)$, which is expressed in Equation 14, it follows that (firstcol[$\tilde{s}_{L\times L}(j)$]) may be expressed as $$circshift\Big((W_{2N\times L}^{10})^\dagger$$
$$circshift\Big(F_{2N\times 2N}^{-1}\text{diagvec}(X_{2N\times 2N}^\dagger(j)X_{2N\times 2N}(j)), \left\lfloor\frac{L}{2}\right\rfloor\Big), -\left\lfloor\frac{L}{2}\right\rfloor\Big).$$

According to some examples, it is proposed that, rather than calculating $H_{2N}(j)$ using Equation 11, $H_{2N}(j)$ may instead be calculated as follows:

$$H_{2N}(j) = \qquad [15]$$
$$H_{2N}(j-1) + \mu F_{2N\times 2N} W_{2N\times L}^{10}\Big[(W_{2N\times L}^{10})^\dagger F_{2N\times 2N}^{-1} X_{2N\times 2N}^\dagger(j-D-1)$$
$$E_{2N}(j-D-1) + \frac{1}{2}\alpha F_{L\times L}^{-1}\tilde{S}_{L\times L}(j-D-1)F_{L\times L}\Delta\hat{h}_L(j)\Big]$$

where $\tilde{S}_{L\times L}(j)$ denotes a diagonal frequency-domain matrix, which may be expressed as:

$$\tilde{S}_{L\times L}(j) = \lambda\tilde{S}_{L\times L}(j-1) + (1-\lambda)F_L\tilde{s}_{L\times L}(j)F_L^{-1} \qquad [16]$$

where $\lambda$ denotes a weighting factor that is analogous to the one used to calculate $S_{2N\times 2N}(j)$ in Equation 10, where $F_{L\times L}$ denotes the L-FFT matrix, and where $F_{L\times L}^{-1}$ denotes the L-IFFT matrix. Using the notation described above, Equation 16 may be rewritten as follows:

$$\tilde{S}_{L\times L}(j) = \quad [17]$$
$$\lambda \tilde{S}_{L\times L}(j-1) + (1-\lambda)\mathrm{diag}mat\Big(F_{L\times L}\mathrm{circshift}\big((W_{2N\times L}^{10})^{\dagger}\cdot\mathrm{circshift}$$
$$\big(F_{2N\times 2N}^{-1}\mathrm{diag}vec\big(X_{2N\times 2N}^{\dagger}(j)X_{2N\times 2N}(j)\big),\left\lfloor\frac{L}{2}\right\rfloor\big),-\left\lfloor\frac{L}{2}\right\rfloor\Big).$$

In contrast to the 2N multiplications required to calculate the term $$\frac{1}{2}\alpha S_{2N\times 2N}(j-D-1)\Delta H_{2N}(j)$$

in Equation 11, only L multiplications are required to calculate the term $$\frac{1}{2}\alpha F_{L\times L}^{-1}\tilde{S}_{L\times L}(j-D-1)F_{L\times L}\Delta\hat{h}_L(j)$$

in Equation 15. Thus, by configuring the digital signal processing to implement Equation 15 (using $\tilde{S}_{L\times L}(j-D-1)$ as defined in Equation 17), rather than Equation 11 (using $S_{2N\times 2N}(j-D-1)$ as defined in Equation 10), it may be possible to reduce the computational complexity associated with delay compensated feedback equalization, which in turn may offer various advantages, such as reduced power and heat.

Figure 5:
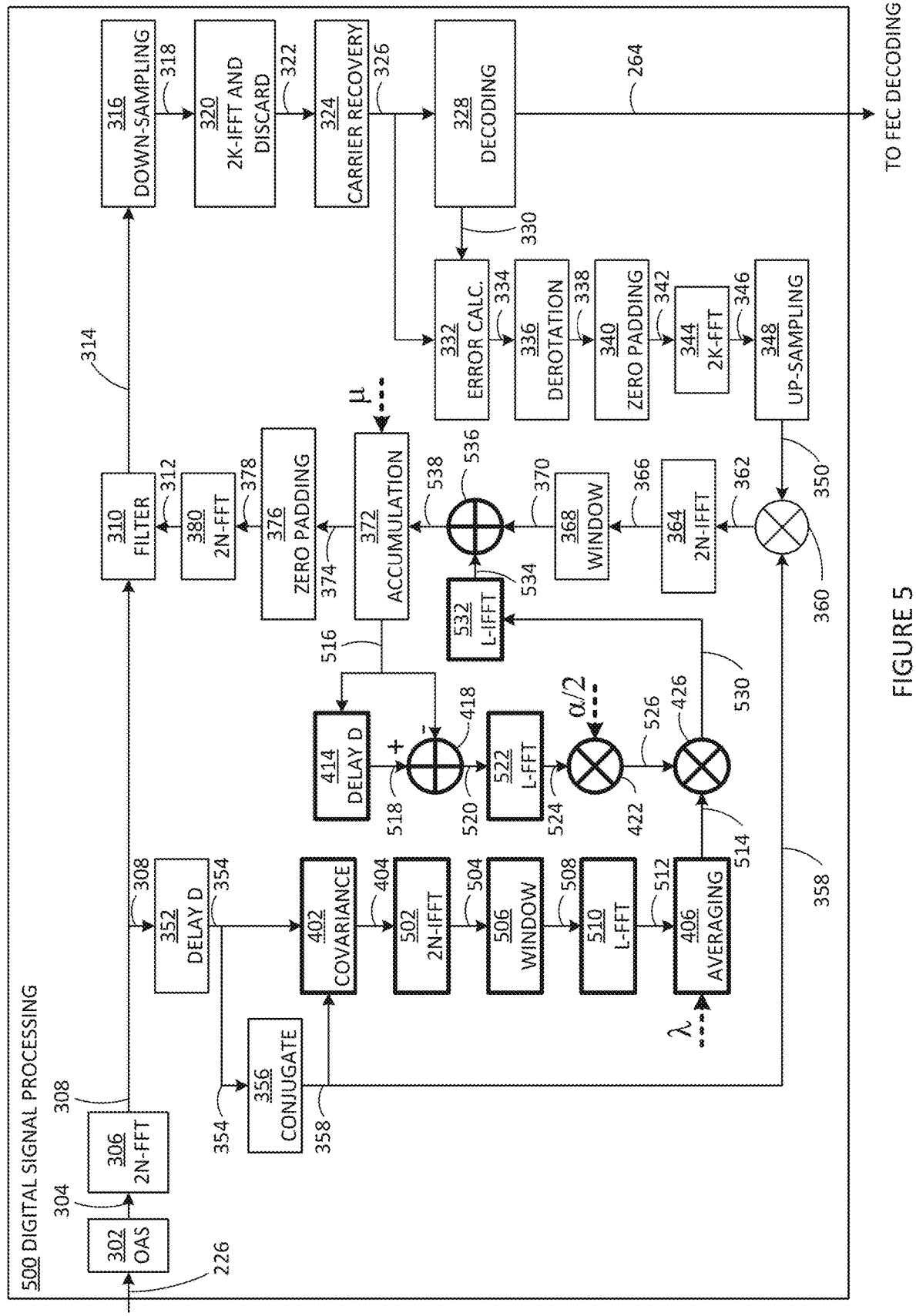
FIG. 5 illustrates digital signal processing for feedback equalization with delay compensation in accordance with a second example of the technology disclosed herein.

FIG. 5 illustrates digital signal processing 500 for feedback equalization with delay compensation in accordance with a second example of the technology disclosed herein. The digital signal processing 500 is an example of the digital signal processing 228 shown in FIG. 2. The digital signal processing 500 includes all of the processing operations of the digital signal processing 300, as well as additional processing operations designed to achieve the statistical delay compensation of Equation 15.

To implement the simplification of Equations 15 and 17, a 2N-IFFT operation 502 is applied to the signals 404 generated by the covariance calculation operation 402, thereby resulting in respective signals 504 which may be expressed as $$\mathrm{circshift}\Big(F_{2N\times 2N}^{-1}\mathrm{diag}vec\big(X_{2N\times 2N}^{\dagger}(j-D-1)X_{2N\times 2N}(j-D-1)\big),\left\lfloor\frac{L}{2}\right\rfloor\Big).$$

A windowing operation 506 is applied to the time-domain signals 504, thereby resulting in respective signals 508 which may be expressed as $$\mathrm{circshift}\big((W_{2N\times L}^{10})^{\dagger}\mathrm{circshift}$$
$$\big(F_{2N\times 2N}^{-1}\mathrm{diag}vec\big(X_{2N\times 2N}^{\dagger}(j-D-1)X_{2N\times 2N}(j-D-1)\big),\left\lfloor\frac{L}{2}\right\rfloor\big),-\left\lfloor\frac{L}{2}\right\rfloor\big).$$

An L-FFT operation 510 is applied to the windowed time-domain signals 508, thereby resulting in respective signals 512 which may be expressed as $$\mathrm{diag}mat\Big(F_{L\times L}\mathrm{circshift}\big((W_{2N\times L}^{10})^{\dagger}\mathrm{circshift}\big(F_{2N\times 2N}^{-1}$$
$$\mathrm{diag}vec\big(X_{2N\times 2N}^{\dagger}(j-D-1)X_{2N\times 2N}(j-D-1)\big),\left\lfloor\frac{L}{2}\right\rfloor\big),-\left\lfloor\frac{L}{2}\right\rfloor\big)\Big).$$

The averaging operation 406 is applied to the signals 512, thereby resulting in respective signals 514 which may be expressed as $\tilde{S}_{L\times L}(j-D-1)$ as defined in Equation 17.

As previously described with respect to FIG. 3, the signals 374 generated by the accumulation operation 372 are representative of the time-domain compensation coefficients $\ddot{h}_L(j)$, which in turn are dependent on the coefficients for the preceding block, namely $\hat{h}_L(j-1)$. As illustrated in FIG. 5, the accumulation operation 372 generates signals 516 which are representative of the time-domain compensation coefficients $\hat{h}_L(j-1)$. The signals 516 undergo the delay D applied by the delay operation 414, thereby resulting in respective signals 518 denoted by $\hat{h}_L(j-D-1)$. The difference operation 418 is applied to the signals 516 and the signals 518, thereby resulting in respective difference signals 520 which are expressed as:

$$\Delta\hat{h}_L(j)=\hat{h}_L(j-D-1)-\hat{h}_L(j-1) \quad [18]$$

The vector $\Delta\hat{h}_L(j)$ is the time-domain version of the vector $\Delta H_{2N}(j)$ expressed in Equation 7.

An L-FFT operation 522 is applied to the signals 520, thereby resulting in respective signals 524 which may be expressed as $F_{L\times L}\Delta\hat{h}_L(j)$.

The multiplication operation 422 calculates the product of the signals 524 and the constant ½α, thereby resulting in respective signals 526 which are expressed as $$\frac{1}{2}\alpha F_{L\times L}\Delta\hat{h}_L(j).$$

The other multiplication operation 426 calculates the product of the signals 526 and the signals 514, thereby resulting in respective signals 530 which are expressed as $$\frac{1}{2}\alpha F_{L\times L}\Delta\hat{h}_L(j)\tilde{S}_{L\times L}(j-D-1).$$

An L-IFFT operation 532 is applied to the signals 530, thereby resulting in respective signals 534 which are expressed as $$\frac{1}{2}\alpha F_{L\times L}^{-1}\tilde{S}_{L\times L}(j-D-1)F_{L\times L}\Delta\hat{h}_L(j).$$

An addition operation 536 calculates the sum of the signals 534 and the signals 370, thereby resulting in respective signals 538 that are input to the accumulation operation 372. As described previously with respect to FIGS. 3 and 4, the signals 374 that are output by the accumulation operation 372 undergo the zero padding operation 376 and the 2N-FFT operation 380, thereby resulting in the respective signals 312 that are representative of the frequency-domain compensation coefficients $H_{2N}(j)$. As a result of the digital signal processing 500 shown in FIG. 5, the signals 312 are expressed by Equation 15.

Figure 6:
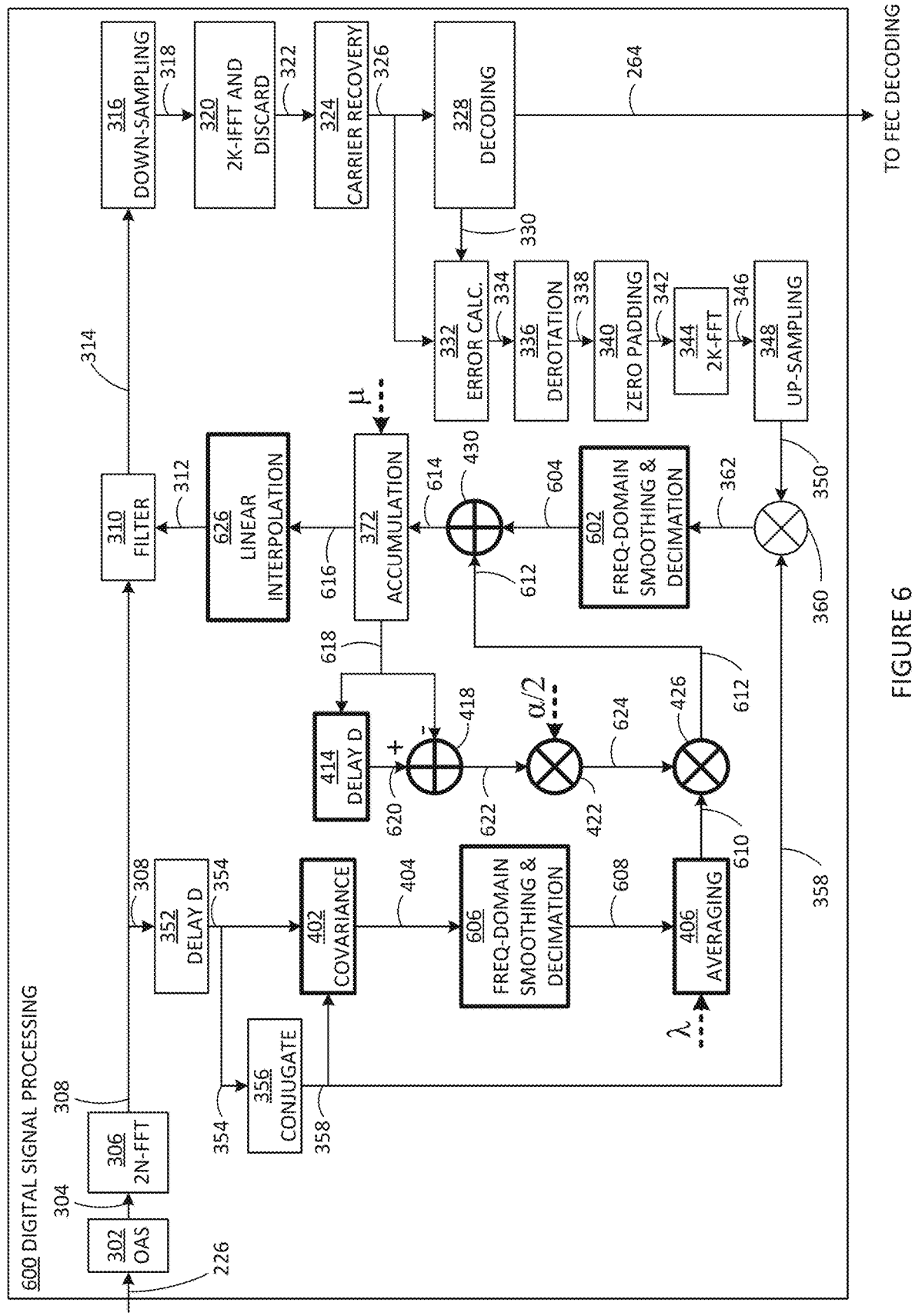
FIG. 6 illustrates digital signal processing for feedback equalization with delay compensation in accordance with a third example of the technology disclosed herein.

FIG. 6 illustrates digital signal processing 600 for feedback equalization with delay compensation in accordance with a third example of the technology disclosed herein. The digital signal processing 600 is an example of the digital signal processing 228 shown in FIG. 2. The digital signal processing 600 includes certain aspects of the digital signal processing 300 and 400, as well as additional processing operations designed to achieve statistical delay compensation.

As described in all of the preceding examples, the multiplication operation 360 generates signals 362 which may be expressed as $$X^{\dagger}_{2N \times 2N}(j-D-1)E_{2N}(j-D-1).$$

However, in place of the 2N-IFFT operation 364, the windowing operation 368, and the L-FFT operations 510 and 522 illustrated in FIG. 5, frequency-domain smoothing and decimation operations 602 and 606 are used. The frequency-domain smoothing may be implemented, for example, as described in U.S. Pat. No. 8,005,368 to Roberts et al., U.S. Pat. No. 8,385,747 to Roberts et al., U.S. Pat. No. 9,094,122 to Roberts et al., and U.S. Pat. No. 9,590,731 to Roberts et al. As shown in FIG. 6, the operation 602 is applied to the signals 362, thereby resulting in respective signals 604 which represent smoothed, decimated versions of the signals 362. The operation 606 is applied to the signals 404, which are expressed as $$X^{\dagger}_{2N \times 2N}(j-D-1)X_{2N \times 2N}(j-D-1),$$

thereby resulting in respective signals 608 which represent smoothed, decimated versions of the signals 404.

The averaging operation 406 is applied to the signals 608, thereby resulting in respective signals 610. The multiplication operation 426 multiplies the signals 610 by the signals 624 (to be described further below), thereby resulting in respective signals 612. The addition operation 430 calculates the sum of the signals 612 and the signals 604, thereby resulting in respective signals 614 that are input to the accumulation operation 372.

The signals 614 are frequency-domain signals, rather than time-domain signals. Accordingly, the accumulation operation 372 generates respective frequency-domain signals 616 which are representative of the frequency-domain compensation coefficients $H_L(j)$. Additionally, the accumulation operation 372 generates frequency-domain signals 618 which are representative of the frequency-domain compensation coefficients of the preceding clock cycle, that is $H_L(j-1)$. The signals 618 undergo the delay D applied by the delay operation 414, thereby resulting in respective signals 620 denoted by $H_L(j-D-1)$. The difference operation 418 is applied to the signals 620 and the signals 618, thereby resulting in respective difference signals 622 which are expressed as:

$$\Delta H_L(j) = H_L(j-D-1) - H_L(j-1) \qquad [19]$$

The multiplication operation 422 calculates the product of the signals 622 and the constant ½α, thereby resulting in the respective signals 624 which are expressed as ½α$\Delta H_L(j)$.

In this example, in place of the L-IFFT operation 532, the zero padding operation 376, and the 2N-FFT operation 380 illustrated in FIG. 5, a linear interpolation operation 626 is used. The linear interpolation operation 626 is implemented in the frequency domain and is used to take an input vector of length L and output a vector of length 2N. As shown in FIG. 6, the linear interpolation operation 626 is applied to the signals 616, thereby resulting in the respective signals 312 that are representative of the frequency-domain compensation coefficients $H_{2N}(j)$ to be used by the filter 310.

Figure 7:
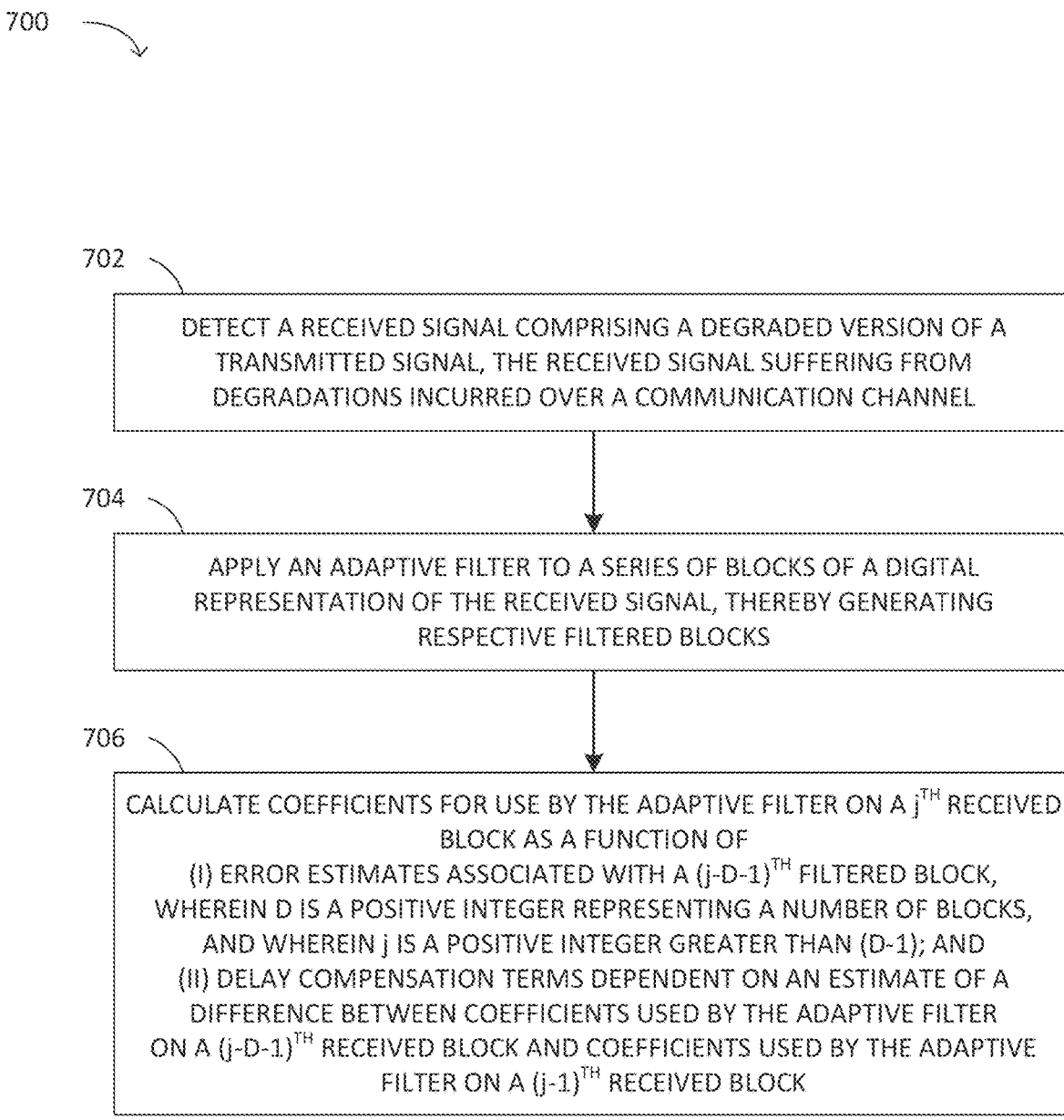
FIG. 7 illustrates an example method for feedback equalization with delay compensation accordance with some examples of the technology disclosed herein.

FIG. 7 illustrates an example method 700 for equalization accordance with some examples of the technology disclosed herein. According to some examples, the method 700 may be performed at a receiver device, such as the receiver device 104 or 200.

At 702, the receiver device detects a received signal comprising a degraded version of a transmitted signal, the received signal suffering from degradations incurred over a communication channel, such as the communication channel 106 between the transmitter device 102 and the receiver device 104. According to some examples, the transmitted signal and the received signal are optical signals, and the degradations incurred over the communication channel include channel effects such as SOP rotation. According to one example, as described with respect to FIG. 2, the received optical signal 204 may be detected by a communication interface of the receiver device 200. The polarizing beam splitter 206 may split the optical signal 204 into the polarized components 208, which may be processed by the optical hybrid 210, thereby resulting in the optical signals 216. The photodetectors 218 may convert the optical signals 216 into the analog signals 220, and the ADCs 224 may generate the respective digital signals 226 from the analog signals 220. According to some examples, the received signal may be representative of data and FEC redundancy that is dependent on the data, the FEC redundancy having been generated as a result of the data having undergone FEC encoding, for example, at the transmitter device 102. According to some examples, the received signal may be representative of symbols. The symbols may include one or more predetermined symbols (also referred to as training symbols).

At 704, the receiver device applies an adaptive filter to a series of received blocks of a digital representation of the received signal, thereby generating respective filtered blocks. For example, the adaptive filter applied at 704 may comprise the filter 310 as described with respect to any one of FIGS. 3-6. As part of the digital signal processing 228 (and 300, 400, 500, and 600), the adaptive filter applied at 704 may be implemented by circuitry such as the ASIC 222, either in the time domain or the frequency domain. According to one example, the digital representation of the received signal may refer to the time-domain signals 226 generated by the ADCs 224. According to another example, the digital representation of the received signal may refer to the frequency-domain signals 308. In general, a received block may be understood as comprising a digital representation of a plurality of samples of the received signal detected at the communication interface over a period of time.

At 706, the receiver device calculates coefficients for use by the adaptive filter on a $j^{th}$ received block. The coefficients are calculated as a function of (i) error estimates associated with a $(j-D-1)^{th}$ filtered block, where D is a positive integer representing a number of blocks, and where j is a positive integer greater than (D−1), and (ii) delay compensation terms dependent on an estimate of a difference between coefficients used by the adaptive filter on a $(j-D-1)^{th}$ received block and coefficients used by the adaptive filter on a $(j-1)^{th}$ received block. The error estimates may be represented, for example, by the signals 334 or the signals 350, or any of the intermediate signals 338, 342, or 346. The delay compensation terms may be represented, for example, by the signals 428 or 530 or 612. According to one example, the delay compensation terms may be represented by the signals 428, which may be expressed as $$\frac{1}{2}\alpha S_{2N\times 2N}(j-D-1)\Delta H_{2N}(j),$$

where $\Delta H_{2N}(j)$ is the difference between the coefficients $H_{2N}(j-D-1)$ and the coefficients $H_{2N}(j-1)$ as expressed in the frequency domain. According to another example, the delay compensation terms may be represented by the signals 530, which may be expressed as $$\frac{1}{2}\alpha F_{L\times L}\tilde{S}_{L\times L}(j-D-1)\Delta \hat{h}_L(j),$$

where $\Delta \hat{h}_L(j)$ is the difference between the coefficients $\hat{h}_L(j-D-1)$ and the coefficients $\hat{h}_L(j-1)$ as expressed in the time domain. According to another example, the delay compensation terms may be represented by the signals 612, which are dependent on the difference $\Delta H_L(j)$ between the coefficients $H_L(j-D-1)$ and the coefficients $H_L(j-1)$ as expressed in the frequency domain.

As described previously, the delay compensation terms used to calculate the coefficients for the $j^{th}$ received block may be calculated using the $(j-D-1)^{th}$ received block. For example, the vector $A_{2N}(j)$ is calculated using $X_{2N\times 2N}(j-D-1)$, as expressed in Equation 6. According to some examples, the delay compensation terms are based on a covariance of the $(j-D-1)^{th}$ received block or an approximation thereof. For example, the delay compensation terms are simplified to $$\frac{1}{2}\alpha X^\dagger_{2N\times 2N}(j-D-1)X_{2N\times 2N}(j-D-1)\Delta H_{2N}(j)$$

in Equation 8, or to $$\frac{1}{2}\alpha S_{2N\times 2N}(j-D-1)\Delta H_{2N}(j)$$

in Equation 11, where $S_{2N\times 2N}(j)$ is generated using a statistical estimate of the covariance over a period of time.

According to some examples, the estimate of the difference between the coefficients used on the $(j-D-1)^{th}$ received block and the coefficients used on the $(j-1)^{th}$ received block may calculated using a difference operation, such as the operation 418 that subtracts the coefficients associated with block $(j-1)$ from the coefficients associated with block $(j-D-1)$. However, other mechanisms may be used to estimate of the difference between the coefficients used on the $(j-D-1)^{th}$ received block and the coefficients used on the $(j-1)^{th}$ received block. For example, the difference estimate may be obtained by calculating $\Delta H_{2N}(j)$ (or $\Delta \hat{h}_L(j)$ or $\Delta H_L(j)$) across a time interval that differs from the delay D. For example, the estimate may be generated from a calculation of a difference between the coefficients used by the adaptive filter on the $(j-D1-1)^{th}$ received block and coefficients used by the adaptive filter on a $(j-D2-1)^{th}$ received block, where D1 and D2 are positive integers, where D1>D2, where D1≤D, and where D2≤D. In this case, the time interval used to determine the estimate is (D1−D2) rather than D.

According to some examples, the current value of the vector $A_{2N}(j)$ in Equation 5 may be included each time the coefficients $H_{2N}(j)$ are updated, such that each new set of coefficients is calculated as a function of the delay compensation terms. According to other examples, the vector $A_{2N}(j)$ may only be included with some of the updates to $H_{2N}(j)$, for example, in a sequential pattern. In other words, a first subset of a series of received blocks may be filtered using coefficients that have been calculated as a function of the delay compensation terms, while a second subset of the series of received blocks may be filtered using coefficients that are independent of any delay compensation terms. The series may be divided into the first and second subsets in any desired manner. As previously described, the term a may be used to control the degree of delay compensation applied for a given clock cycle. According to one example, the digital signal processing may be designed such that every tenth update of $H_{2N}(j)$ is calculated as a function of the delay compensation terms (i.e., $\alpha>0$), while the other nine updates are calculated without delay compensation (i.e., $\alpha=0$).

According to some examples, rather than the delay compensation being achieved by modifying the coefficients $H_{2N}(j)$ using the delay compensation terms, the filter 310 may be configured to apply separate coefficients that implement the delay compensation.

According to some examples, in place of the expression in Equation 5, $H_{2N}(j)$ may instead be a nonlinear function of $$X^\dagger_{2N\times 2N}(j-D-1), E_{2N}(j-D-1),$$

and the vector $A_{2N}(j)$. It is also contemplated that, as an alternative to the expression in Equation 6, other calculations or approximations may be used to calculate the vector $A_{2N}(j)$.

According to some examples, the proposed techniques for feedback equalization with delay compensation described in this document may be used in conjunction with other equalization operations. For example, although not illustrated in FIGS. 3-6, a static equalizer filter may be applied to the signals 308 prior to the feedback equalization, in order to compensate for relatively slow changes in the channel response. Additionally or alternatively, techniques for feed-forward equalization as described in U.S. patent application Ser. No. 16/903,792, filed Jun. 17, 2020, may be used in conjunction with the delay-compensated feedback equalization techniques described herein to compensate for very fast changes in channel response.

In general, various controls and operations may overlap or operate within any of the adaptive filtering loops described in this document, including, for example, clock recovery, jitter suppression, carrier frequency recovery, carrier phase recovery, maximum-likelihood symbol detection, DC offset, transient tracking, noise whitening, quantization, clipping, and gain control.

In general, any of the adaptive filtering loops described in this document may include approximations, quantization, clipping, windowing, DC-balance, leaking, scaling, rounding, filtering, averaging, or various other operations that are not explicitly described but are familiar to persons skilled in the art.

The scope of the claims should not be limited by the details set forth in the examples, but should be given the broadest interpretation consistent with the description as a whole.

What is claimed is:

1. A receiver device comprising:
   a communication interface configured to detect a received signal comprising a degraded version of a transmitted signal, the received signal suffering from degradations incurred over a communication channel; and circuitry configured to apply an adaptive filter to a series of received blocks of a digital representation of the received signal, thereby generating respective filtered blocks; and calculate coefficients for use by the adaptive filter on a $j^{th}$ received block as a function of (i) error estimates associated with a $(j-D-1)^{th}$ filtered block, wherein D is a positive integer representing a number of blocks, and wherein j is a positive integer greater than (D−1); and (ii) delay compensation terms dependent on an estimate of a difference between coefficients used by the adaptive filter on a $(j-D-1)^{th}$ received block and coefficients used by the adaptive filter on a $(j-1)^{th}$ received block.

2. The receiver device as claimed in claim 1, wherein the circuitry is further configured to calculate the delay compensation terms using the $(j-D-1)^{th}$ received block.

3. The receiver device as claimed in claim 2, wherein the delay compensation terms are based on a covariance of the $(j-D-1)^{th}$ received block or an approximation thereof.

4. The receiver device as claimed in claim 3, wherein the circuitry is further configured to generate the approximation using a statistical estimate of the covariance over a plurality of the received blocks.

5. The receiver device as claimed in claim 1, wherein each received block comprises a respective digital representation of a plurality of samples of the received signal detected at the communication interface over a period of time.

6. The receiver device as claimed in claim 1, wherein the circuitry is further configured to calculate frequency-domain representations of the coefficients for use by the adaptive filter on the $j^{th}$ received block using frequency-domain representations of the delay compensation terms; and apply the adaptive filter to the series of received blocks in the frequency-domain.

7. The receiver device as claimed in claim 1, wherein the received signal is representative of symbols, and wherein the circuitry is further configured to decode estimates of the symbols represented by the $(j-D-1)^{th}$ filtered block; and calculate the error estimates associated with the $(j-D-1)^{th}$ filtered block using the decoded estimates of the symbols.

8. The receiver device as claimed in claim 7, wherein the symbols include one or more predetermined symbols.

9. The receiver device as claimed in claim 1, wherein the communication channel comprises an optical communication channel.

10. The receiver device as claimed in claim 1, wherein the circuitry is further configured to apply the adaptive filter to a first subset of the series of received blocks using coefficients calculated as a function of respective delay compensation terms; and apply the adaptive filter to a second subset of the series of received blocks using coefficients that are independent of any delay compensation terms.

11. A method comprising:

at a communication interface of a receiver device, detecting a received signal comprising a degraded version of a transmitted signal, the received signal suffering from degradations incurred over a communication channel;

applying an adaptive filter to a series of received blocks of a digital representation of the received signal, thereby generating respective filtered blocks; and calculating coefficients for use by the adaptive filter on a $j^{th}$ received block as a function of (i) error estimates associated with a $(j-D-1)^{th}$ filtered block, wherein D is a positive integer representing a number of blocks, and wherein j is a positive integer greater than (D−1); and (ii) delay compensation terms dependent on an estimate of a difference between coefficients used by the adaptive filter on a $(j-D-1)^{th}$ received block and coefficients used by the adaptive filter on a $(j-1)^{th}$ received block.

12. The method as claimed in claim 11, further comprising calculating the delay compensation terms using the $(j-D-1)^{th}$ received block.

13. The method as claimed in claim 12, wherein the delay compensation terms are based on a covariance of the $(j-D-1)^{th}$ received block or an approximation thereof.

14. The method as claimed in claim 13, further comprising generating the approximation using a statistical estimate of the covariance over a plurality of the received blocks.

15. The method as claimed in claim 11, wherein each received block comprises a respective digital representation of a plurality of samples of the received signal detected at the communication interface over a period of time.

16. The method as claimed in claim 11, further comprising calculating frequency-domain representations of the coefficients for use by the adaptive filter on the $j^{th}$ received block using frequency-domain representations of the delay compensation terms; and applying the adaptive filter to the series of received blocks in the frequency-domain.

17. The method as claimed in claim 11, wherein the received signal is representative of symbols, the method further comprising decoding estimates of the symbols represented by the $(j-D-1)^{th}$ filtered block; and calculating the error estimates associated with the $(j-D-1)^{th}$ filtered block using the decoded estimates of the symbols.

18. The method as claimed in claim 17, wherein the symbols include one or more predetermined symbols.

19. The method as claimed in claim 11, wherein the communication channel comprises an optical communication channel.

20. The method as claimed in claim 11, further comprising applying the adaptive filter to a first subset of the series of received blocks using coefficients calculated as a function of respective delay compensation terms; and applying the adaptive filter to a second subset of the series of received blocks using coefficients that are independent of any delay compensation terms.

* * * * *